No. 713,784. Patented Nov. 18, 1902.
L. B. MELLOR.
DEVICE FOR MEASURING AND RECORDING VARIABLE DIAMETERS OF TUBING OR SIMILAR STRUCTURES.
(Application filed Feb. 11, 1902.)
(No Model.) 2 Sheets—Sheet 2.
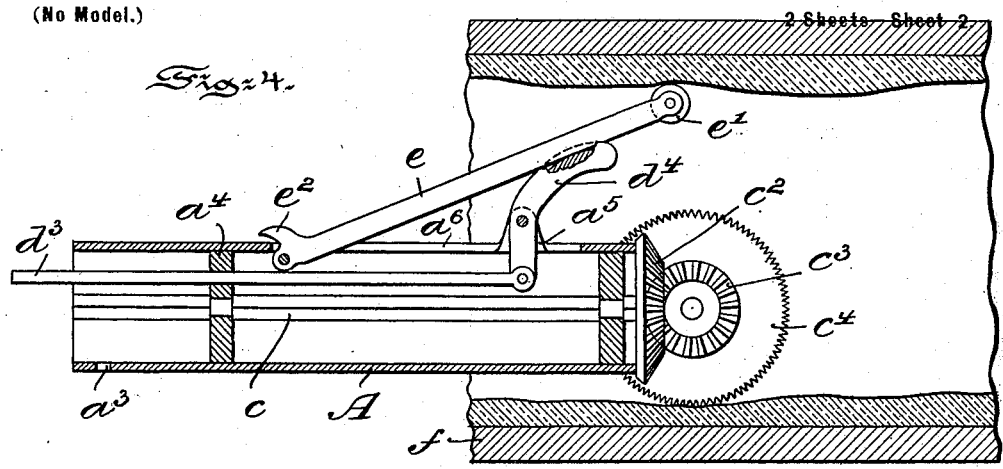
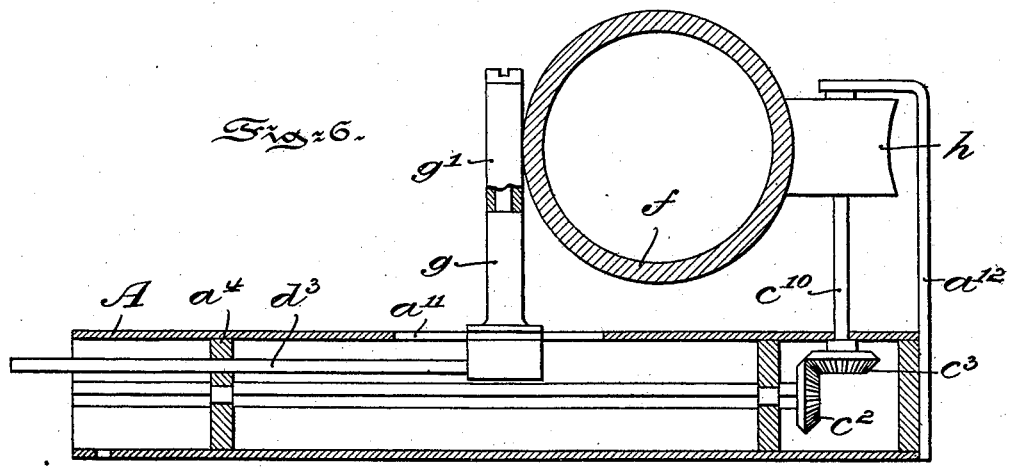
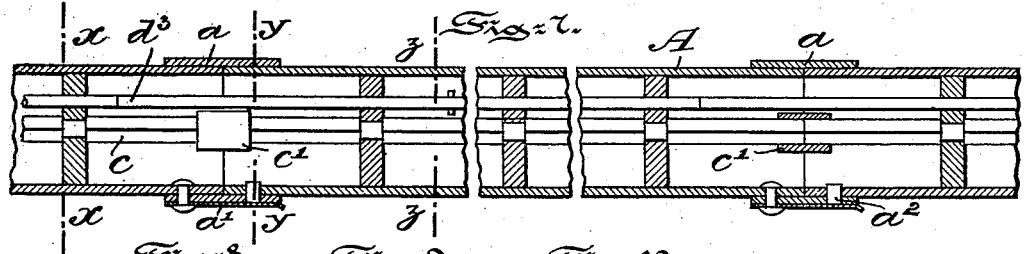
Witnesses:
Wilhelm Vogt
Thomas M. Smith.
Inventor:
Laurence Bancroft Mellor,
By J. Walter Douglas
Attorney

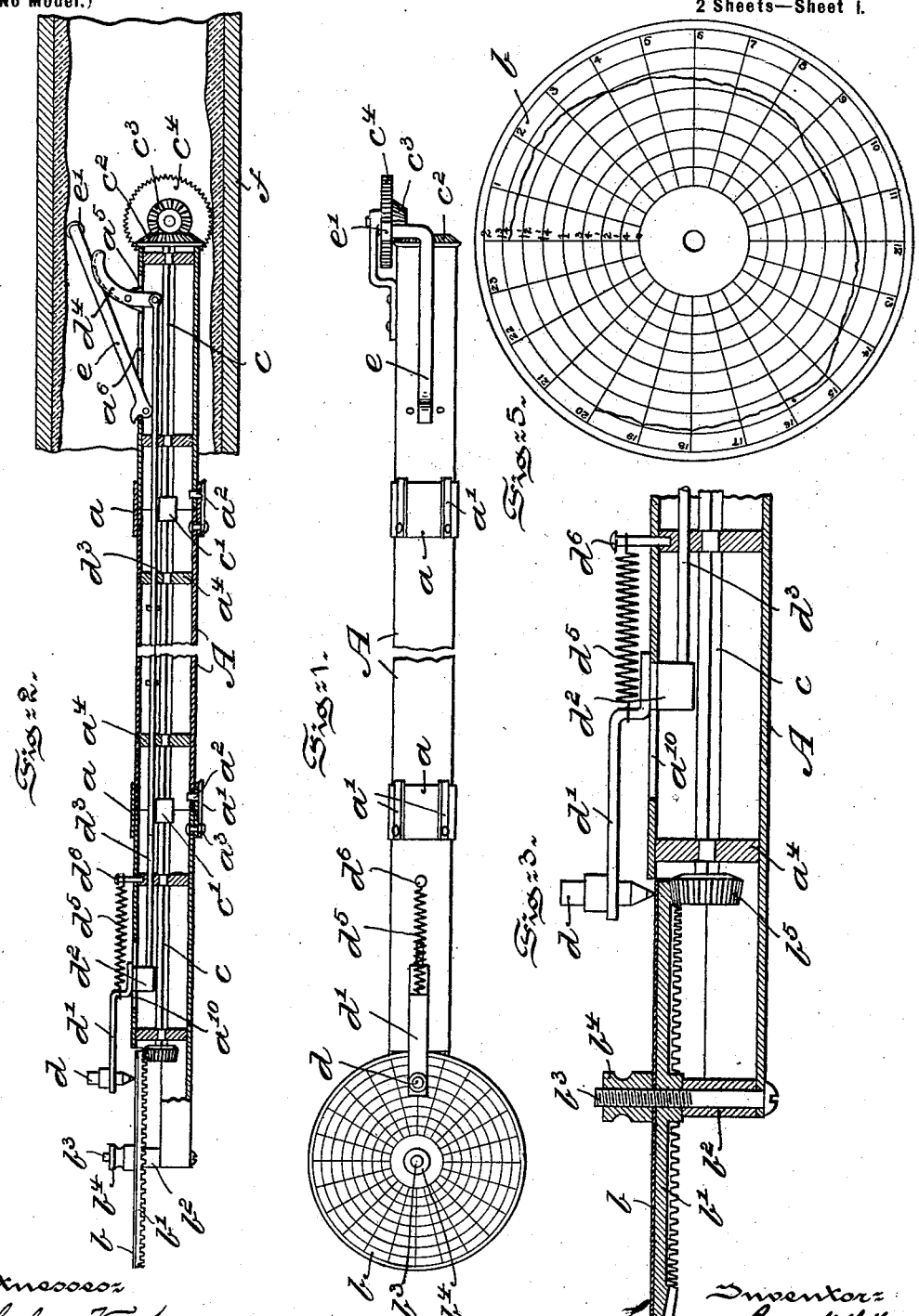

UNITED STATES PATENT OFFICE.

LAURENCE BANCROFT MELLOR, OF GERMANTOWN, PENNSYLVANIA.

DEVICE FOR MEASURING AND RECORDING VARIABLE DIAMETERS OF TUBING OR SIMILAR STRUCTURES.

SPECIFICATION forming part of Letters Patent No. 713,784, dated November 18, 1902.

Application filed February 11, 1902. Serial No. 93,502. (No model.)

*To all whom it may concern:*

Be it known that I, LAURENCE BANCROFT MELLOR, a citizen of the United States, residing at Germantown, in the county of Philadelphia and State of Pennsylvania, have invented certain new and useful Improvements in Devices for Measuring and Registering Variable Diameters of Tubing or Similar Structures, of which the following is a specification.

My invention has relation to a device for accurately determining the extent of scale or other extraneous matter forming on boiler-tubes, cylinders, or other similar bodies by reliably recording on a dial or indicator the extent of such scale and extraneous matter thereon; and in such connection my invention relates to the general construction and arrangement of such a device, to the manipulating of the same for accomplishing accurately and quickly the said results, and to the providing of a device which is adapted to be readily assembled for the use mentioned among other uses thereof.

The principal object of my invention is to provide a comparatively simple, durable, and effective device for measuring and recording variable diameters of boiler-tubes and other tubular bodies and consisting, essentially, of a body portion, bearing devices each projecting beyond the plane of a different surface of the body portion and adapted to contact with the surfaces to be measured, a record-support operatively connected with said body portion and adapted to be moved by one of said bearing devices, and a recording device adapted to be operated by the other of said bearing-surfaces.

My invention, stated in general terms, consists of a device for measuring and recording the variable diameters of boiler-tubes and other similar structures, substantially as hereinafter described and claimed.

The nature and scope of my invention will be more fully understood from the following description, taken in connection with the accompanying drawings, forming part hereof, in which—

Figure 1 is a top or plan view of a device embodying features of my invention. Fig. 2 is a longitudinal sectional view of the device and of a tube, showing internal scale formation or incrustation, with the device extended into the tube some distance to define by the outline effected by the pointer on the dial at the other end of the device the extent of such scale formation or incrustation on the interior surface of the tube. Fig. 3 is a similar view, on an enlarged scale, in broken section, of the left-hand portion of the device, showing the pointer in such position as to indicate or define the true diameter of the tube before scale formation thereon or after removal thereof. Fig. 4 is a longitudinal sectional view, on an enlarged scale, of the right-hand portion of the device of Fig. 3 shown in application to a boiler-tube and defining or pointing out on the dial, as of Fig. 5, the extent of scale or incrustation on the interior surface of said tube. Fig. 5 is a top or plan view of a graduated dial-plate, showing an irregular line thereon described by the manipulation of the dial around about the pointer to disclose the extent of incrustation or scale formation upon the interior of the tube—such, for example, as illustrated in Fig. 2. Fig. 6 is a view, partly in longitudinal section, of the device and a cross-section of a boiler-tube in which the device is in contact with the exterior surface of said tube, showing another application of the device of my invention for defining and indicating the extent on the dial or the like of foreign matter accumulating on the exterior surface of boiler-tubes or other similar structures. Fig. 7 is an enlarged view, partly in broken section, of different sections of the device, showing the manner of connecting said sections for use and of the coupling means for the shaft controlling the operative or working parts of the device. Figs. 8, 9, and 10 are cross-sectional views on the lines $xx$, $yy$, and $zz$ of Fig. 7; and Fig. 11 is a perspective view of two parts of the square shaft with the coupling means secured to one end of the shaft to show the manner of securing another of the sections of the square shaft thereto for the operation of the said device.

Referring to the drawings, A represents a sectional casing or housing for the working parts of the device, which sections are adapted to be joined together by bands $a$, provided with spring-snap-locking catches $a'$. The band $a$ is riveted to one section and is adapted to lap onto another, so that a prong or spur $a^2$ of each spring-catch $a'$ of the band $a$ will be adapted to enter an opening $a^3$, as clearly shown in Figs. 1 and 2. In each of the sections of the casing or housing A at suitable distances apart are provided perforated partitions $a^4$ to not only strengthen the wall of the casing A, but to also serve as bearings for the shaft $c$ and rod $d^3$, extending through the body of said casing or housing for actuating working parts of the device, to be presently fully explained.

$b$ is a graduated circular scale-dial mounted upon a platform or disk-rack $b'$, which is supported in position upon a post $b^2$ by means of a partially-threaded bolt $b^3$ at the left-hand end of the casing or housing A, which is cut away to receive the post. The threaded portion of the bolt $b^3$ is provided with a tightening-nut $b^4$ for clamping the toothed disk $b'$, carrying the graduated dial $b$, with respect to a pinion $b^5$, which is mounted on, preferably, a square-shape sectional shaft $c$, held together by means of couplings $c'$, whereof one end of each coupling is fastened to a section of the square-shape shaft $c$ and the other section of the said shaft is adapted to snugly fit each of said couplings $c'$, but readily detachable therefrom when sections of the casing or housing A are detached from each other. The right-hand end of the square shaft $c$ is provided with a miter-gear $c^2$, adapted to mesh with a complemental gear $c^3$ of a toothed or spur-like traveler-wheel $c^4$, as illustrated in Figs. 1, 2, and 4.

$d$ is a scriber or pencil of any suitable construction mounted in a bracket $d'$ and provided with a projecting bearing $d^2$, rigidly secured to the sectional rod $d^3$, extending longitudinally through the casing or housing A and carrying at the opposite end a reciprocating grooved lever-arm $d^4$. This grooved lever-arm $d^4$ is pivoted to a vertical extension or bracket $a^5$ of the casing A, as illustrated in Figs. 2 and 4.

$e$ is a trolley-pole pivoted to the casing A in an oblong slot $a^6$ thereof and carrying at one end a rotatable traveler-roller $e'$ and at the other end on one side a pawl $e^2$ to serve as a back-stop, so as to limit the extent of the upwardly-inclined movement of the trolley-pole $e$ to bring the roller of the pole into contact with the internal surface of the tubing $f$ when the grooved lever-arm $d^4$ has been reciprocated, by means of the rod $d^3$, by the scriber or pencil back and forth through the rotation of the graduated scale-dial $b$. The bracket of the scriber or pencil $d$ is held under tension by a spring $d^5$, secured at one end to the bracket $d'$ and at the other end to a post $d^6$, fastened in the casing A and projecting upward therefrom, as clearly illustrated in Figs. 2 and 3. The downwardly-projecting bearing of the scriber-bracket $d'$ has a limited range of back-and-forth movement within an oblong slot $a^{10}$, provided for the same in the casing A, as illustrated in Fig. 2. The boiler or similar tube $f$ has shown therein in Figs. 2 and 4 in irregular outline matter purporting to be scale or incrustation, which is formed therein by use, and when the spur-like surface of the traveler-wheel $c^4$ is forced into the tube $f$ it actuates, through the miter-gears $c^2$ and $c^3$, shaft $c$, and pinion $b^5$, the disk $b'$ to cause the dial carried thereby to have indicated thereon by the scriber or pencil $d$ the degree of irregularity as to diameter of the tube $f$, due to the formation of the scale or other foreign matter thereon, as clearly illustrated in Figs. 2 and 4, with respect to the true diameter of the tubing $f$ before such foreign matter formed upon the same. At the same time when the scriber or pencil is moving on the dial $b$, the spring $d^5$ will actuate the rod $d^3$ to control the position within the tube $f$, through the grooved lever-arm $d^4$, the trolley $c$, against the opposite surface of the tubing $f$, to the position of the traveler toothed wheel $c^4$, in the tube $f$, as illustrated in Figs. 2 and 4, to thereby provide a handy device for readily and accurately determining when boiler and other tubes are in need of cleaning or of being brought into their original condition for insuring the best practical results therefrom.

In Fig. 6 is illustrated an application of my present invention for determining the formation of scale, incrustation, or other foreign matter on the exterior surface of a boiler-tube $f$ or similar structure. In this instance the sectional scriber or pencil rod $d^3$ carries a pillar or post $g$, provided with a roller $g'$. This post or pillar is adapted to be afforded a range of movement back and forth within a slot $a^{11}$ of the casing A and the square shaft $c$, controlling the platform or disk $b'$, carrying the graduated dial $b$ and pinion $b^5$ at the end opposite thereto, in which miter-gears $c^2$ and $c^3$ mesh with each other. From the gear $c^3$ extends vertically a shaft or spindle $c^{10}$, having a grooved roller $h$ fixed thereon. This vertical shaft $c^{10}$ is journaled in a frame $a^{12}$, suitably secured to and supported from the housing or casing A, as shown in Fig. 6. By this arrangement the disk $b'$, carrying the dial $b$, will be actuated by the square-shape shaft $c$, the miter-gears $c^2$ and $c^3$, the vertical shaft $c^{10}$, and the grooved roller $h$, and the scriber $d$ will be actuated on the dial $b$ by the rod $d^3$ receiving its movement from the pillar or post $g$ to cause on the dial to be recorded accurately by irregular outline similar to that in Fig. 5 the exact amount of foreign matter to be removed from the exterior surface of the tube $f$ to restore the same to its original condition. The sections of the rod $d^3$ of the scriber or pencil $d$ contact with each other, as shown, or they may be coupled to each other in the same manner as the sections of the square shaft $c$ are coupled to each other.

It will be manifestly obvious that as to minor details modifications may be made in the arrangement of the invention without departing from the spirit and scope of the same, and hence I do not wish to be understood as limiting myself to the precise construction and arrangements as illustrated and in particular as explained; but,

Having thus described the nature and objects of my invention, what I claim as new, and desire to secure by Letters Patent, is—

1. In a device of the character described, a body portion, bearing devices, each projecting normally beyond the plane of a different surface of the body portion and adapted to contact with surfaces to be measured, a record-support carried by said body portion and adapted to be moved by one of said bearing devices, and a recording device operated by the other of said bearing devices.

2. In a device of the character described, a body portion, bearing devices each projecting beyond the plane of a different surface of the body portion and adapted to contact with surfaces to be measured, a record-support operatively connected with said body portion and adapted to be moved by one of said bearing devices, and a recording device operated by the other of said bearing devices.

In testimony whereof I have hereunto set my signature in the presence of two subscribing witnesses.

LAURENCE BANCROFT MELLOR.

Witnesses:
J. WALTER DOUGLASS,
THOMAS M. SMITH.